United States Patent
Zhang et al.

(10) Patent No.: US 10,771,182 B2
(45) Date of Patent: Sep. 8, 2020

(54) ENHANCING ROUTING METRICS

(71) Applicant: Cisco Technology, Inc., San Jose, CA (US)

(72) Inventors: Randy Zhang, Plano, TX (US); Rajiv Asati, Morrisville, NC (US); Gabriele Maria Galimberti, Bovisio Masciago (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/961,903

(22) Filed: Apr. 25, 2018

(65) Prior Publication Data

US 2019/0334650 A1  Oct. 31, 2019

(51) Int. Cl.
| | | |
|---|---|---|
| *H04B 10/08* | (2006.01) | |
| *H04B 17/00* | (2015.01) | |
| *H04J 14/02* | (2006.01) | |
| *H04Q 11/00* | (2006.01) | |
| *H04L 12/751* | (2013.01) | |

(52) U.S. Cl.
CPC .......... *H04J 14/0267* (2013.01); *H04L 45/02* (2013.01); *H04Q 11/0062* (2013.01); *H04Q 2011/0073* (2013.01); *H04Q 2011/0098* (2013.01)

(58) Field of Classification Search
CPC .............................................. H04Q 2011/0073
USPC ........................................ 398/25, 28, 45, 51
See application file for complete search history.

(56) References Cited

U.S. PATENT DOCUMENTS

| | | | |
|---|---|---|---|
| 6,728,484 B1 | 4/2004 | Ghani | |
| 6,961,573 B1 * | 11/2005 | Moon | H04W 40/02 455/445 |
| 6,999,729 B2 * | 2/2006 | Wandel | H04W 24/00 370/229 |
| 7,209,434 B2 * | 4/2007 | Kano | H04L 45/00 370/216 |
| 7,430,176 B2 * | 9/2008 | Nalawade | H04L 45/028 370/238 |
| 7,536,101 B1 * | 5/2009 | Jones | H04J 14/0227 398/4 |
| 9,258,174 B1 * | 2/2016 | Gerstel | H04L 29/06537 |
| 2002/0018269 A1 | 2/2002 | Chaudhuri et al. | |
| 2002/0063916 A1 * | 5/2002 | Chiu | H04L 49/557 398/2 |
| 2002/0159396 A1 * | 10/2002 | Carlson | H04L 47/32 370/252 |

(Continued)

OTHER PUBLICATIONS

Husseman, Trevor: "A Beginer's Guide to Understanding the Leaf-Spine Network Topology"; Available from: https://blog.westmonroepartners.com/a-beginners-guide-to-understanding-the-leaf-spine-network-topology/, Mar. 23, 2016.

*Primary Examiner* — David C Payne
*Assistant Examiner* — Pranesh K Barua

(57) ABSTRACT

In one embodiment, a first optical network device includes a controller, and a first network interface, wherein the first network interface is configured to exchange data with a first layer 3 network device, and the controller is configured to obtain at least one optical circuit attribute including an optical circuit distance and/or an optical circuit latency of a first optical circuit in an optical network, and provide the at least one optical circuit attribute to the first layer 3 network device. Related apparatus and methods are also described.

20 Claims, 5 Drawing Sheets

(56) References Cited

U.S. PATENT DOCUMENTS

| | | | |
|---|---|---|---|
| 2003/0020982 A1* | 1/2003 | Rychlicki | H04J 14/02 398/79 |
| 2003/0025959 A1* | 2/2003 | Nagarajan | H04Q 11/0062 398/45 |
| 2005/0078656 A1* | 4/2005 | Bryant | H04L 45/123 370/351 |
| 2006/0251419 A1* | 11/2006 | Zadikian | H04J 14/0295 14/295 |
| 2007/0177511 A1* | 8/2007 | Das | H04L 45/42 370/238 |
| 2007/0280685 A1* | 12/2007 | Rodrigo | H04Q 11/0066 398/45 |
| 2007/0297405 A1* | 12/2007 | He | H04L 45/52 370/389 |
| 2008/0189426 A1* | 8/2008 | Xu | H04L 69/08 709/227 |
| 2011/0170448 A1* | 7/2011 | Buob | H04L 45/02 370/252 |
| 2011/0170859 A1* | 7/2011 | Conklin | H04L 45/62 398/25 |
| 2011/0170860 A1* | 7/2011 | Smith | H04J 3/0682 398/25 |
| 2011/0222847 A1* | 9/2011 | Wang | H04Q 11/0062 398/19 |
| 2011/0318004 A1* | 12/2011 | Bruno | H04Q 11/0062 398/45 |
| 2012/0120808 A1* | 5/2012 | Nandagopal | H04L 45/028 370/238 |
| 2013/0163981 A1* | 6/2013 | Ceccarelli | H04J 14/0258 398/2 |
| 2013/0173953 A1* | 7/2013 | Grammel | H04L 41/0668 714/4.1 |
| 2013/0212268 A1* | 8/2013 | Fu | H04L 45/121 709/224 |
| 2013/0266325 A1* | 10/2013 | Giustiniano | H04B 10/116 398/130 |
| 2013/0297527 A1* | 11/2013 | Luo | G06Q 10/08355 705/338 |
| 2014/0086576 A1* | 3/2014 | Campbell | H04J 14/0269 398/28 |
| 2014/0112350 A1* | 4/2014 | Kwon | H04L 45/50 370/437 |
| 2014/0233946 A1* | 8/2014 | Gerstel | H04L 45/62 398/45 |
| 2014/0258486 A1* | 9/2014 | Filsfils | H04L 45/245 709/223 |
| 2015/0043570 A1* | 2/2015 | Filsfils | H04L 41/0813 370/351 |
| 2015/0296279 A1* | 10/2015 | Bouda | H04L 41/142 398/45 |
| 2016/0057043 A1* | 2/2016 | Osborne | H04L 43/10 370/248 |
| 2016/0191194 A1* | 6/2016 | Wood | H04B 10/27 398/58 |
| 2016/0261933 A1* | 9/2016 | Jenkins | H04J 14/0217 |
| 2017/0116564 A1* | 4/2017 | Luo | G06Q 10/083 |
| 2017/0237582 A1* | 8/2017 | Gero | H04L 41/0893 398/66 |
| 2018/0013669 A1* | 1/2018 | Bardhan | H04L 49/351 |
| 2018/0262422 A1* | 9/2018 | Gerstel | H04L 45/28 |
| 2019/0014394 A1* | 1/2019 | Anand | H04M 11/002 |

* cited by examiner

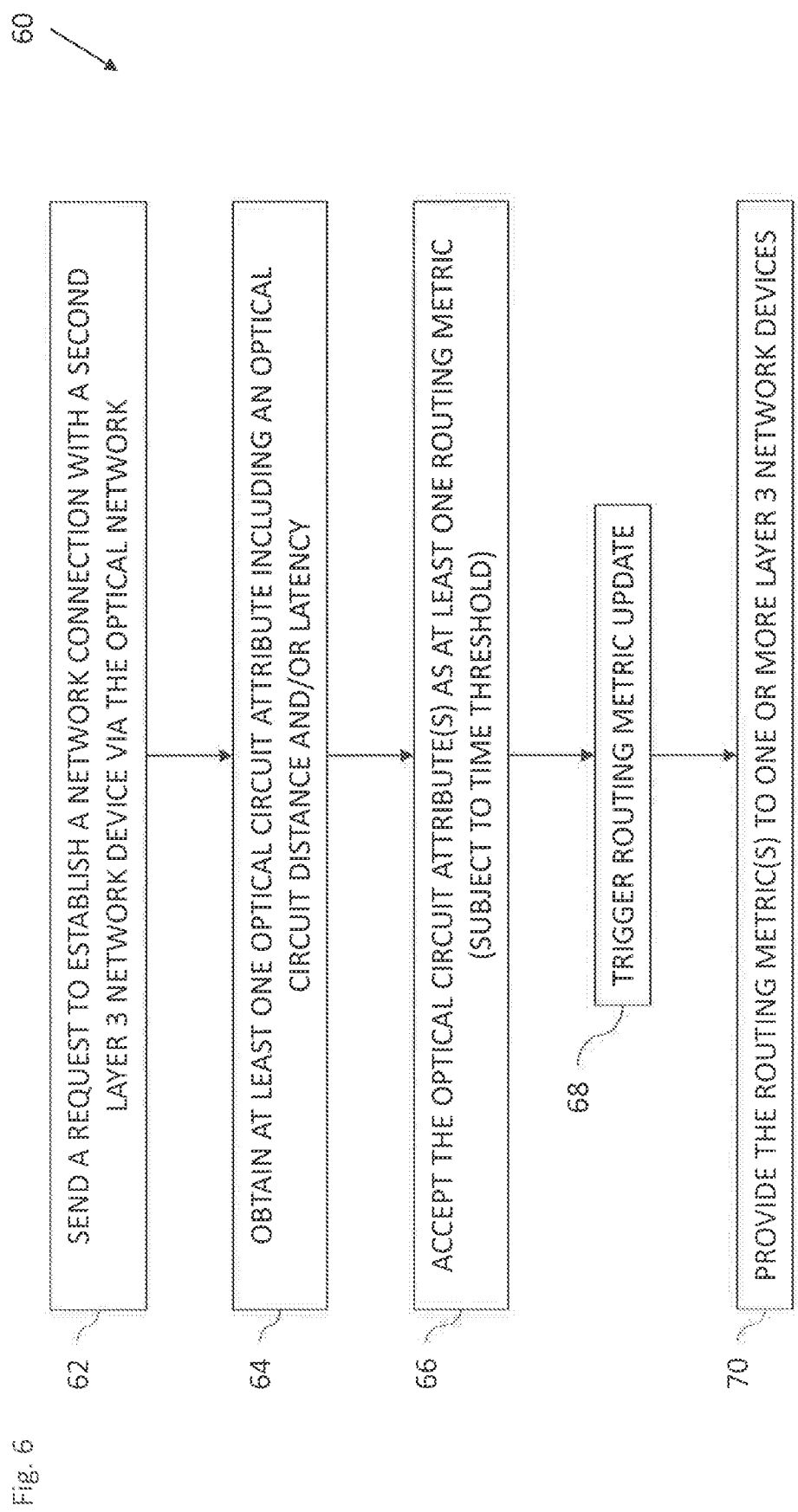

ENHANCING ROUTING METRICS

TECHNICAL FIELD

The present disclosure generally relates to enhancing routing metrics.

BACKGROUND

By way of introduction, a current routing metric for a given link is generally treated as a constant, non-dynamic value, which is often based on link speed e.g., bandwidth, without regard to the other underlying link attributes. Even when other attributes are considered, the other attributes are typically provided manually and with static configurations, which may or may not accurately represent the underlying link attributes at a given moment. To influence metric computation, routing operators statically configure a cost value to represent link attributes. By way of example, Enhanced Interior Gateway Routing Protocol (EIGRP) defines a static interface delay as a component of its metric calculation.

Layer 3 services today are often built over a wavelength division multiplexing (WDM) based optical infrastructure in a multilayer network, which may consist of multiple paths in each layer. The multiple paths of the optical network are commonly built with colorless directionless contentionless (CDC) reconfigurable optical add drop multiplexer (ROADM) nodes. Multilayer optical networks typically support dynamic wavelength routing during initial optical circuit provisioning, which means accurate circuit attributes are unknown prior to the circuit creation.

BRIEF DESCRIPTION OF THE DRAWINGS

The present disclosure will be understood and appreciated more fully from the following detailed description, taken in conjunction with the drawings in which:

FIG. 6 is a flow chart including exemplary steps in a method of operation of a layer 3 network device constructed and operative in accordance with an embodiment of the present disclosure.

DESCRIPTION OF EXAMPLE EMBODIMENTS

Overview

There is provided in accordance with an embodiment of the present disclosure, a first optical network device including a controller, and a first network interface, wherein the first network interface is configured to exchange data with a first layer 3 network device, and the controller is configured to obtain at least one optical circuit attribute including an optical circuit distance and/or an optical circuit latency of a first optical circuit in an optical network, and provide the at least one optical circuit attribute to the first layer 3 network device.

There is also provided in accordance with another embodiment of the present disclosure, a first layer 3 network device including a controller, and at least one network interface, wherein the at least one network interface is configured to exchange data with at least one second layer 3 network device via an optical network, which includes a first optical network device, and the controller is configured to obtain, from the first optical network device, at least one optical circuit attribute including an optical circuit distance and/or an optical circuit latency of a first optical circuit in the optical network, and accept the at least one optical circuit attribute as at least one routing metric.

DETAILED DESCRIPTION

Figure 1:
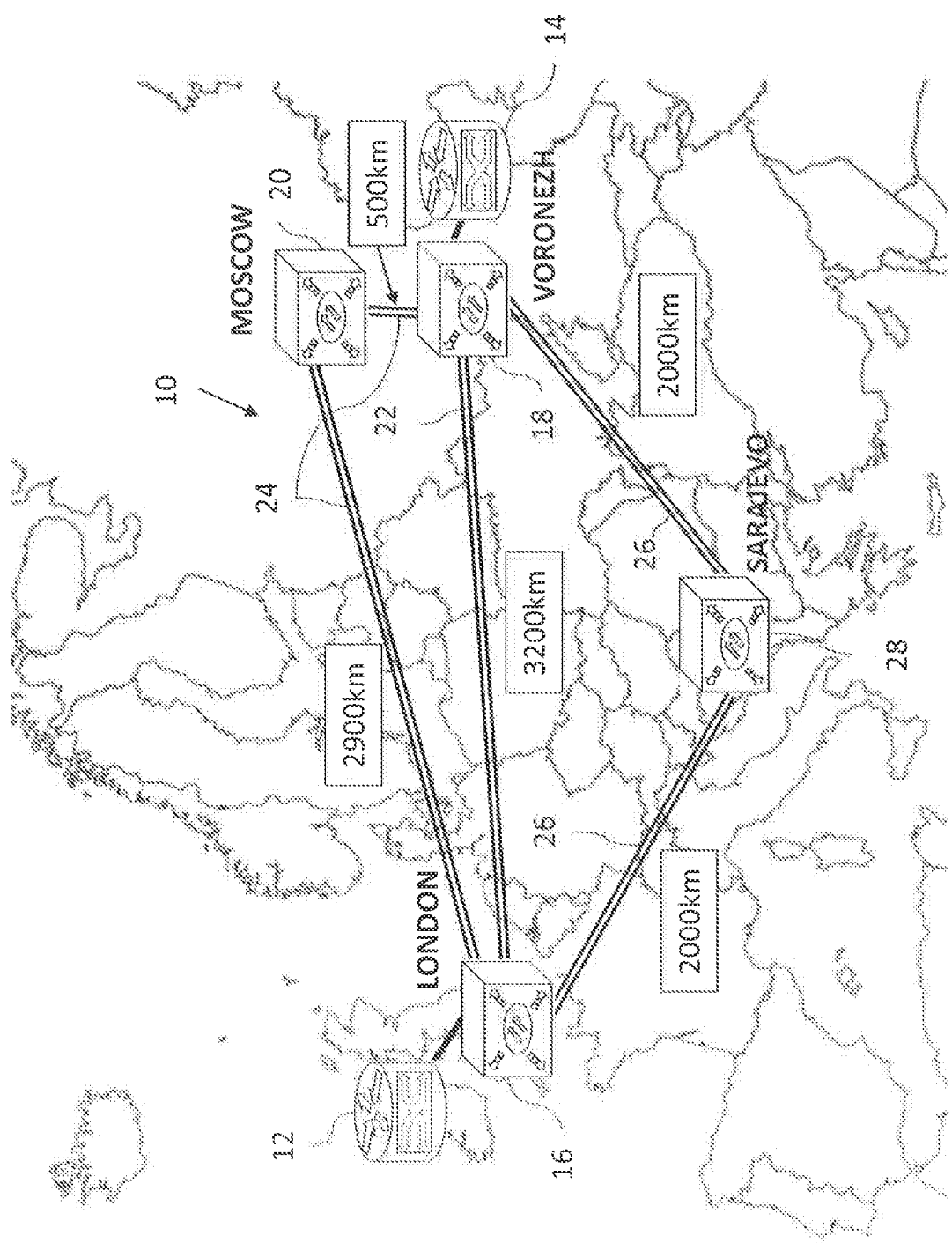
FIG. 1 is a partly pictorial, partly block diagram view of an optical mesh network constructed and operative in accordance with an embodiment of the present disclosure.

Reference is made to FIG. 1, which is a partly pictorial, partly block diagram view of an optical mesh network 10 constructed and operative in accordance with an embodiment of the present disclosure. It will be appreciated that the devices of the present disclosure may also be implemented in a non-mesh optical network, for example, but not limited to, a ring network.

By way of introduction, in a multilayer network that includes a routing layer and an optical layer, a point-to-point link at layer 3 may be connected over a wavelength that is delivered through a wavelength-division multiplexing (WDM) network, e.g. the optical mesh network 10, which includes multiple paths. Layer 3 is also sometimes known as the network layer in the OSI model of computer networking. In the example, of FIG. 1 a layer 3 device, e.g., a router 12, located in the United Kingdom (UK) establishes a layer 3 link with a layer 3 device, e.g., a router 14 in the south of Russia, near Voronezh. The link may be established via the optical mesh network 10, which includes three different paths from an optical network device 16 in London to an optical network device 18 in Voronezh. A first path 22 is a direct path from the optical network device 16 to the optical network device 18 with an approximate optical circuit distance of 3200 kilometers (km). A second path 24 is an indirect path via an optical network device 20 located in Moscow with an approximate total optical circuit distance of 3400 km (2900 km plus 500 km). A third path 26 is an indirect path via an optical network device 28 located in Sarajevo with a total approximate optical circuit distance of 4000 km (2000 km plus 2000 km). The router 12 is connected to the optical network device 16 via any suitable connection, fir example but not limited to, a wired or wireless connection. The router 14 is connected to the optical network device 18 via any suitable connection, for example but not limited to, a wired or wireless connection. It can be seen that the various optical circuits of the paths 22, 24, 26 provide different, and sometimes very different, optical circuit distances. The optical circuit latency of each path is likely to be different, and sometimes very different, as one component of optical circuit latency is the length of the optical fiber. The optical network devices 16, 18, 20, 28 may be optical switches by way of example only. The optical mesh network 10 may include other paths (not shown) with other optical network devices (not shown). It will be appreciated that any path may include one or more hops.

Among optical attributes, optical circuit distance and optical circuit latency generally have a direct impact over layer 3 services. Two layer 3 links with the same layer 3 metric may have different, and sometimes significantly different, optical circuit attributes as illustrated above with reference to the paths 22, 24, 26 of FIG. 1. Additionally, the optical mesh network 10 may be built with CDC ROADMs such that the optical mesh network 10 supports dynamic routing of circuits during optical circuit creation, path optimization after an optical circuit is created, and path rerouting (restoration) in case of fiber failures. Therefore, when the optical mesh network 10 performs protection, restoration, or optimization during the life of an optical circuit, the circuit attributes of the optical circuit being used may change significantly. Without an awareness of the attributes of the underlying optical circuit, layer 3 traffic may be forwarded down a suboptimal path.

The optical and layer 3 devices of the present disclosure enable dynamically incorporating optical layer information, such as optical circuit distance and optical circuit latency, into a routing metric(s) to allow layer 3 network devices to more accurately make forwarding decisions reflecting the underlying infrastructure of the optical mesh network 10 and a more optimal forwarding performance at layer 3.

In the example of FIG. 1, when an optical circuit from router 12 to the router 14 is signaled initially, an optical circuit may be established on the second path 24 between the optical network device 16 and the optical network device 18 via the optical network device 20 located in Moscow based on one or more factors as known in the art. Assuming the path 26 via the optical network device 28 in Sarajevo is used for restoration and the direct path 22 is unavailable at that time, the total circuit distance would be changed from the original 3400 km to 4000 km after the restoration. Suppose there are other paths (not shown) between the router 12 and the router 14, and if optical circuit distance and/or optical circuit latency information is obtained by the optical network devices 16, 18, then the routers 12, 14 can take the optical circuit attributes into consideration when selecting the appropriate path for a particular class of traffic. It will be appreciated that enhanced path selection will produce more optimal traffic forwarding at layer 3.

In overview, for a given optical circuit, the optical network devices 16, 18 (which are edge optical nodes of the optical mesh network 10 with respect to the routers 12, 14) obtain the optical circuit attributes including optical circuit distance and optical circuit latency of the selected optical circuit. The term "obtain", as used in the specification and claims, in all grammatical forms, is defined to include: (a) receiving the optical circuit attribute(s) from one or more optical network devices (which may have calculated and/or measured the optical circuit attribute(s) or received the optical circuit attribute(s) from one or more optical network devices and so on); (b) measuring and/or calculating the optical circuit attribute(s); and (c) receiving data from one or more optical network devices and calculating the optical circuit attributes from the received data or any suitable combination thereof. The optical network devices 16, 18 report the optical circuit attributes to the routers 12, 14, respectively. The routers 12, 14 receive and accept the optical circuit attributes as routing metrics and trigger metric updates to various routing protocols. The routing protocols running on the various layer 3 network devices advertise the metric updates to peer layer 3 network devices. The routing protocols running on the various layer 3 network devices, including the routers 12, 14 trigger path computations regarding which path to take between the layer 3 network devices.

Optical circuit latency includes two components, link latency, and node latency. Link latency is transmission delay caused by the light propagation through a span of fibers and other passive optical components, and thus is closely related to fiber distance. The node latency is the delay resulting from light going through each optical node, which may vary depending on the type(s) of optical nodes and configurations. Node latency for a transponder, for example, may be between 5 and 20 microseconds, depending on the type of forward error correction (FEC) selected. One or more edge optical nodes (e.g., the optical network devices 16, 18) may measure live end-to-end latency for each optical circuit and provide that information to the routers 12, 14.

Measuring optical circuit distance and latency may be performed using any suitable method as known in the art. Optical nodes equipped with an optical supervisory channel and Optical Time Domain Reflectometry (OTDR) may measure span length. Transponders may measure optical circuit path length by measuring a round trip packet fly time. Optical nodes may measure latency for each span of fiber and through each optical node. Link latency is the sum of span latencies that the circuit has traversed and node latency is the sum of latencies incurred through each node for that circuit. Optical circuit latency is the sum of link latency and node latency. The optical circuit distance and latency may be measured by any of the optical network devices 16, 19, 20, 28, periodically, upon request by one of the routers 12, 14, or as part of optimization, protection, or restoration.

The optical circuit distance and/or optical circuit latency for a particular circuit may be reported by the optical network devices 16, 18 to the routers 12, 14, respectively, using a suitable protocol, for example, but not limited to, Generalized Multiprotocol Label Switching (GMPLS) User-Network Interface (UNI). The reporting optionally includes other data, for example, but not limited to, circuit identification (ID), optical performance values, additional circuit attributes such as Shared Risk Link Group (SRLG), and optical path.

Optical circuit distance and/or optical circuit latency may be reported by the optical network devices 16, 18 in any one or more of the following cases: after an optical circuit is created; periodically per configuration; upon changes in optical circuit distance and/or optical circuit latency (for example, due to optimization and/or restoration) that exceed a configurable threshold; or per client request. If a change in optical circuit distance and/or optical circuit latency is less than the configurable threshold, the change may not be reported to the routers 12, 14.

The routers 12, 14 may enforce, per user configuration, a time-scaled threshold on changes in optical circuit distance and/or latency. The time-scaled threshold may help reduce updates to the routing metrics if the optical network devices 16, 18 send optical circuit distance and/or optical circuit latency within the time-scaled threshold of sending a previous optical circuit distance and/or optical circuit latency. So for example, the routers 12, 14 may wait a time period (e.g., 5 minutes or 10 minutes) equal to the time-scaled threshold before accepting the optical circuit distance and/or optical circuit latency as a routing metric. If a newer optical circuit distance and/or optical circuit latency is received within the time period, the previously received optical circuit distance and/or optical circuit latency is ignored. Alternatively, or additionally, to reduce unnecessary updates to the routers 12, 14, the optical edge nodes 16, 18 may also implement a similar time threshold prior to sending updates to the routers 12, 14.

Each routing protocol using the optical circuit distance and/or optical circuit latency as a routing metric generally maintains the control of how to advertise the routing metrics to layer 3 peers.

Figure 2:
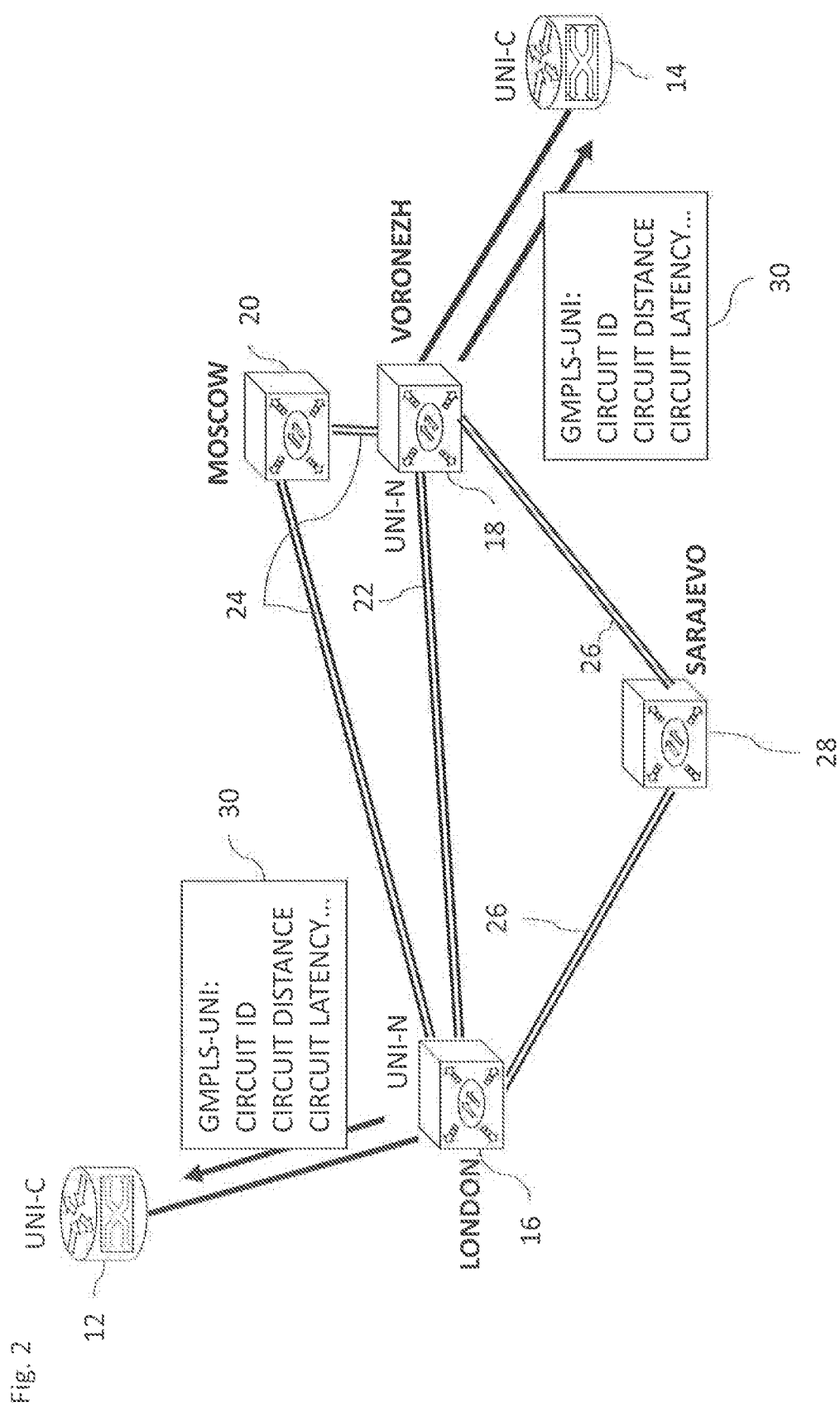
FIG. 2 is a block diagram view of optical network devices in the optical network of FIG. 1 performing optical circuit attribute reporting to a plurality of layer 3 network devices.

Reference is made to FIG. 2, which is a block diagram view of the optical network devices 16, 18, 20, 28 in the optical network 10 of FIG. 1 performing optical circuit attribute reporting to the layer 3 network devices, e.g., routers 12, 14. The optical circuit attributes include optical circuit distance and/or optical circuit latency, and optionally other optical circuit attributes.

The optical network devices 16, 18 (also referred to as edge optical nodes) may use any suitable dynamic control-plane protocol, for example, GMPLS-UNI to report the optical circuit attributes to the routers 12, 14, respectively. GMPLS-UNI connects a routing client (UNI-C) (e.g., one of the routers 12, 14) to an optical server network node (UNI-N) (e.g., one of the edge optical network devices 16, 18). UNI-N provides the optical circuit attributes to UNI-C via one or more path messages 30 in any one or more of the following cases: after an optical circuit is created; periodically per configuration; upon changes in optical circuit distance and/or optical circuit latency (for example, due to optimization and/or restoration) that exceed a configurable threshold; or per client (UNI-C) request. A UNI-C may signal a request for certain attributes and requirement boundaries (e.g., maximum optical circuit latency and/or distance) for use when the optical mesh network 10 sets up an optical circuit for a requested layer 3 link. Each UNI-C may potentially derive different routing metrics based on the optical circuit attributes for the same layer 3 link. In such a case, the highest optical circuit attribute from the different optical circuit attributes may be used.

For interoperability, the GMPLS-UNI protocol may need to be updated for reporting the optical circuit attributes using a suitable Type Length Value (TLV). An example now follows: (1) link type: will be set to point to point (value 1); (2) link ID: router ID of the remote UNI-C; (3) local interface Internet Protocol (IP) address: IP address of the local UNI-C interface; (4) remote interface IP address: IP address of the remote UNI-C interface; (5) optical circuit distance: distance in km as provided by local UNI-N; and (6) optical circuit latency: latency in ns as provided by local UNI-N.

Routing protocols may be amended to use the enhanced routing metric (based on the optical circuit attributes) to generate updates with peers. The TLV numbers may be determined based on the enhancement to existing RFCs for interoperability. The following are some example routing protocols, which may be updated for the enhanced routing metric. For Open Shortest Path First (OSPF) protocol, optical circuit attributes may be advertised in a new Sub-TLV inside the Optical Node Property TLV (6). For Intermediate System-Intermediate System (ISIS) protocol, optical circuit attributes may be advertised via a new sub-TLV, Extended IS reachability TLV (22). For Border Gateway Protocol (BGP), optical circuit attributes may be advertised as Multi Exit Discriminator (MED) Attribute per operator choice and configuration. Numerical values may be scaled as needed. For Enhanced Interior Gateway Routing Protocol (EIGRP), optical circuit attributes may be advertised as a new TLV. EIGRP may scale and use the optical circuit latency instead of delay for the routing metric calculation.

Optical circuit distance may be used in some cases whereas optical circuit latency may be used in others. For example, the selection of optical circuit distance or latency may be dependent on the use cases or protocols being used. Optical circuit distance may be a more intuitive representation of the optical circuit for use by network administrators, whereas circuit latency may be a more accurate representation of circuit performance. Routing protocols may choose to use optical circuit latency as a more granular metric in selecting a path, while circuit distance may be used to represent a routing topology or metric if there is no significant difference between what the optical circuit distance and the latency represent in the optical network 10. It will be appreciated that the enhanced routing metric feature should be uniformly implemented within the same routing administrative domain.

Path computation by the layer 3 network devices (e.g., the routers 12, 14) with the enhanced routing metric may be protocol and/or network operator dependent. In accordance with a first exemplary method, a protocol or operator may continue to use existing metrics for path selection and use the enhanced metrics as a tiebreaker. In accordance with a second exemplary method, a protocol or operator may choose the enhanced metrics in place of existing metrics thereby creating a uniform metric domain. This second exemplary method may be more disruptive to existing networks, than the first exemplary method as it involves some form of metric conversion for links that do not support optical circuit attributes. It may be possible to create a composite metric that combines an existing routing metric and the routing enhanced metric after some numerical scaling is performed.

Figure 3:
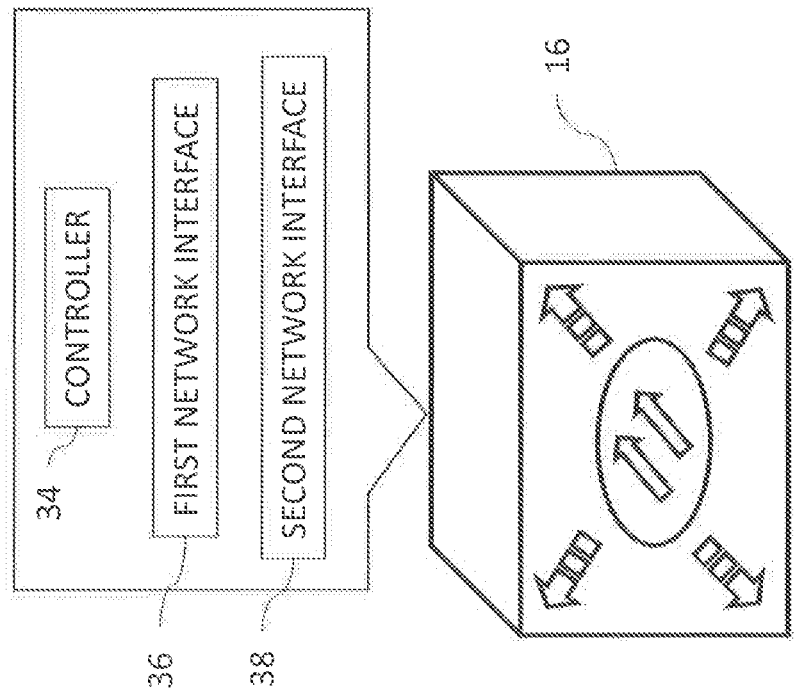
FIG. 3 is a block diagram view of an optical network device constructed and operative in accordance with an embodiment of the present disclosure.

Reference is made to FIG. 3, which is a block diagram view of the optical network device 16 of FIG. 2. Reference is also made to FIG. 2. It will be appreciated that the optical network device 18 may include similar elements as those described below with reference to the optical network device 16. The optical network device 16 includes a controller 34, a first network interface 36, and a second network interface 38. The first network interface 36 is configured to exchange data with a first layer 3 network device (e.g., the router 12) via a non-optical network connection (e.g., a wired or wireless connection, or any suitable combination thereof). The second network interface 38 is configured to exchange data with one or more optical network devices (e.g., the optical network device 20 and the optical network device 28), the optical network device(s) being disposed in the optical network 10. The controller 34 is described in more detail with reference to FIG. 5.

Figure 4:
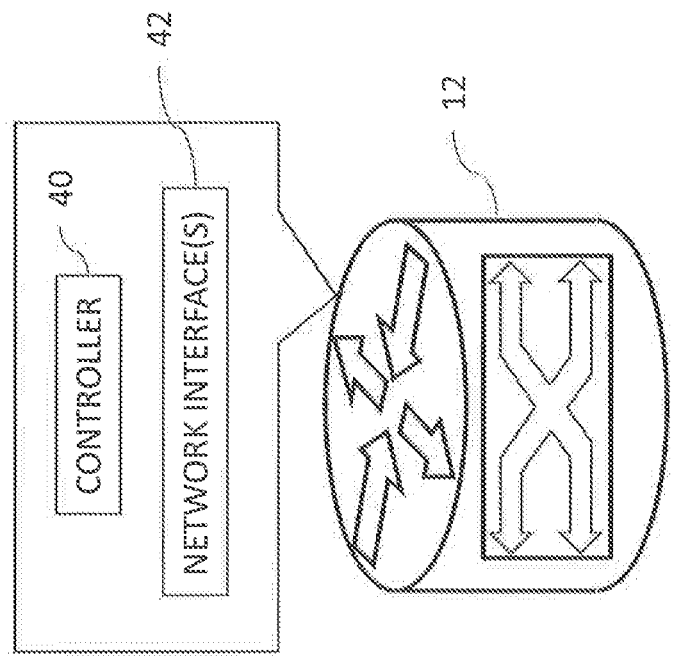
FIG. 4 is a block diagram view of a layer 3 network device constructed and operative in accordance with an embodiment of the present disclosure.

Reference is made to FIG. 4, which is a block diagram view of the router 12 (which is an example of a layer 3 network device). It will be appreciated that the router 14 (FIG. 2) may include similar elements as those described below with reference to the router 12. The router 12 includes a controller 40 and at least one network interface 42. The network interface(s) 42 is configured to: exchange data with a first optical network device (e.g., the optical network device 16) via a UNI network connection, by way of example only; and exchange data with at least one other layer 3 network device via the optical network 10. The operation of the controller 40 is described in more detail with reference to FIG. 6.

Figure 5:
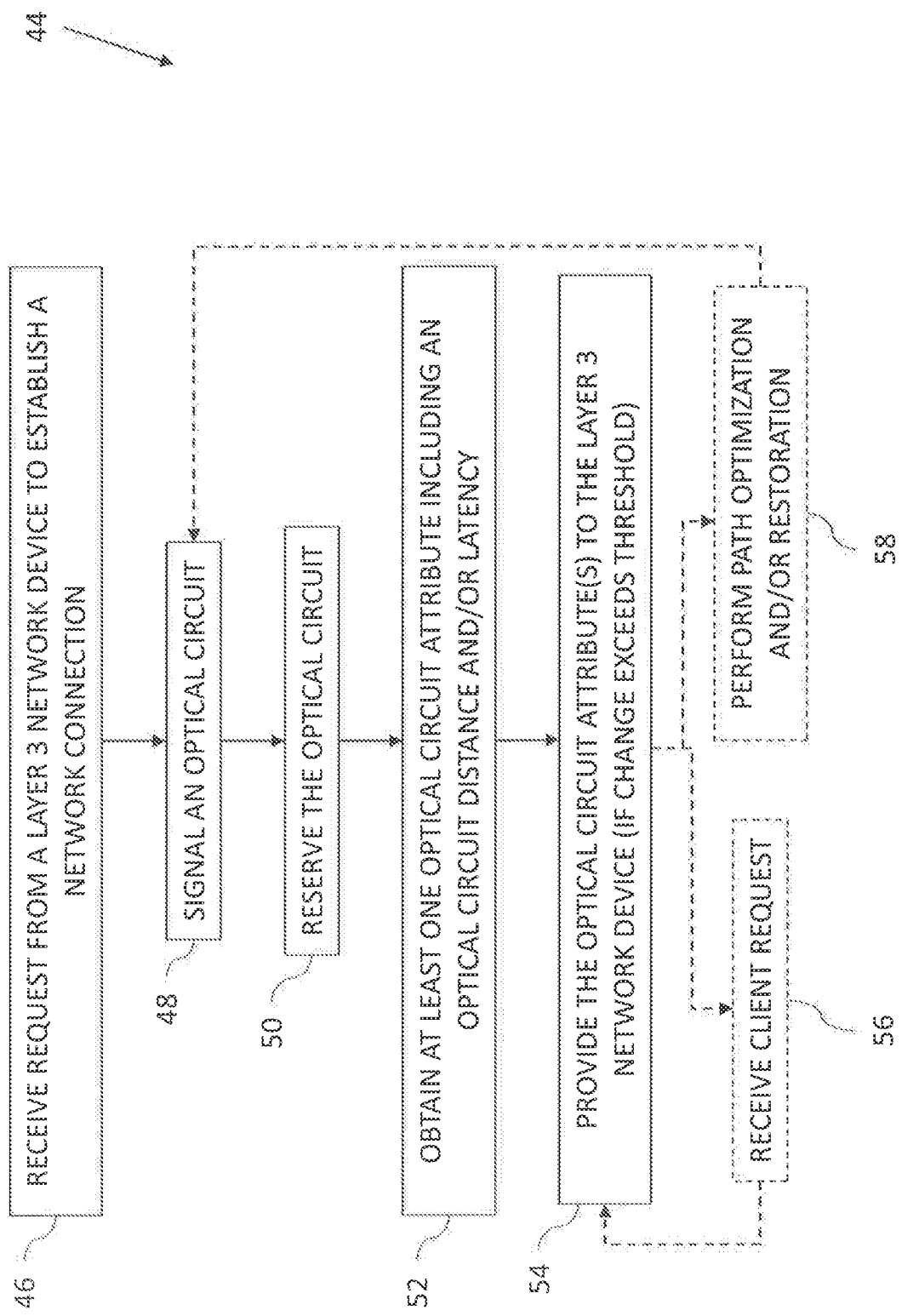
FIG. 5 is a flow chart including exemplary steps in a method of operation of an optical network device constructed and operative in accordance with an embodiment of the present disclosure.

Reference is made to FIG. 5, which is a flow-chart 44 including exemplary steps in a method of operation of the optical network device 16 of FIG. 3. Reference is also made to FIGS. 2 and 3.

The controller 34 is configured to receive (block 46) a request from the router 12. The request may comprise a request by the router 12 to establish a network connection with the router 14 via the optical network 10. The controller 34 is configured to signal (block 48) an optical circuit based on at least one factor, for example, but not limited to, a maximum optical circuit distance and/or latency. The controller 34 is configured to reserve (block 50) the optical circuit, for example using a reservation protocol.

In response to receiving the request, the controller 34 is configured to obtain (block 52) at least one optical circuit attribute including an optical circuit distance and/or an optical circuit latency of the signaled optical circuit in which the optical network device 16 is included. The optical circuit latency includes a link latency and a node latency of the signaled optical circuit. Also in response to receiving the request, the controller 34 is configured to provide (block 54) the at least one optical circuit attribute to the router 12 via a dynamic control plane protocol, such as GMPLS-UNI, by way of example only.

The controller 34 is optionally configured to receive (block 56) a client request to provide the at least one optical circuit attribute. This request may be received at any time while the link is already established. The controller 34 is then configured to repeat the step of block 54 and possibly also repeat the step of block 52 prior to performing the step of block 54.

The controller 34 may be configured to perform path optimization and/or restoration (block 58) which may include repeating the steps of blocks 48-54 in response to a path optimization in the optical network and/or a restoration in the optical network 10.

In the step of block 54, the provision (reporting) of the at least one optical circuit attribute may be subject to a threshold as described above with reference to FIG. 1. Therefore, the controller 34 may be configured to provide the at least one optical circuit attribute to the router 12 in response to the at least optical circuit attribute changing by more than at least one threshold value.

Reference is made to FIG. 6, which is a flow chart 60 including exemplary steps in a method of operation of the router 12 of FIG. 4. Reference is also made to FIGS. 2 and 3. The controller 40 is configured to send (block 62) a request, to the optical network device 16, to establish a network connection with the router 14 via the optical network 10. The controller 40 is configured to obtain (block 64), from the optical network device 16, at least one optical circuit attribute including an optical circuit distance and/or an optical circuit latency of an optical circuit in the optical network 10 in which the optical network device 16 is included. The controller 40 is configured to accept (block 66) the at least one optical circuit attribute as at least one routing metric. The controller 40 is configured to trigger (block 68) a routing metric update in response to accepting the at least one optical circuit attribute as the at least one routing metric. The controller 40 is configured to provide (advertise) (block 70) the at least one routing metric to one or more layer 3 network devices.

In practice, some or all of the functions of each controller 34, 40 may be combined in a single physical component or, alternatively, implemented using multiple physical components. These physical components may comprise hard-wired or programmable devices, or a combination of the two. In some embodiments, at least some of the functions of each controller 34, 40 may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A first optical network device comprising:
a controller; and
a first network interface, wherein:
the first network interface is configured to exchange data with a first layer 3 network device; and
the controller is configured to:
  receive, via the first network interface, from the first layer 3 network device, a request for at least one optical circuit attribute;
  obtain the at least one optical circuit attribute including an optical circuit distance and/or an optical circuit latency of a first optical circuit in an optical network; and
  upon expiration of a time period equal to a time-scaled threshold, provide, via the first network interface, the at least one optical circuit attribute to the first layer 3 network device, wherein the first optical network device connects the first layer 3 network device to the optical network;
  receive another request from the first layer 3 network device; and
  in response to receiving the another request:
    provide the at least one optical circuit attribute to the first layer 3 network device, wherein the another request comprises requesting by the first layer 3 network device to establish a network connection with a second layer 3 network device via the optical network,
    signal the first optical circuit based on at least one factor, and
    reserve the first optical circuit.

2. The device according to claim 1, wherein the at least one optical circuit attribute includes the optical circuit distance of the first optical circuit and the optical circuit latency of the first optical circuit.

3. The device according to claim 1, wherein the optical circuit latency includes a link latency of the first optical circuit and a node latency of the first optical circuit.

4. The device according to claim 1, wherein the controller is configured to provide the at least one optical circuit attribute to the first layer 3 network device in response to the at least one optical circuit attribute changing by more than at least one threshold value.

5. The device according to claim 1, wherein the controller is configured to:
obtain the at least one optical circuit attribute; and
provide the at least one optical circuit attribute to the first layer 3 network device, further in response to any one or more of the following a path optimization in the optical network or a restoration in the optical network.

6. The device according to claim 1, wherein the controller is configured to provide the at least one optical circuit attribute to the first layer 3 network device via a dynamic control plane protocol.

7. The device of claim 1, wherein the first layer 3 network device is a routing client and the first optical network device is an edge optical server network node connecting the first layer 3 network device to the optical network, and wherein the at least one optical circuit attribute is provided in a dynamic control-plane protocol message that includes at least two from among: a link type, a link identifier, a local interface Internet protocol address, a remote interface Internet protocol address, the optical circuit distance, and the optical circuit latency.

8. A first layer 3 network device comprising:
a controller; and
at least one network interface, wherein:
the at least one network interface is configured to exchange data with at least one second layer 3 network device via an optical network, the optical network including a first optical network device; and
the controller is configured to:
transmit, via the at least one network interface to the first optical network device, a request for at least one optical circuit attribute;
obtain, from the first optical network device, the at least one optical circuit attribute including an optical circuit distance and/or an optical circuit latency of a first optical circuit in the optical network;
upon expiration of a time period equal to a time-scaled threshold, accept the at least one optical circuit attribute as at least one routing metric, wherein the first optical network device connects the first layer 3 network device to the optical network;
transmit another request, to the first optical network device, to establish a network connection with a second layer 3 network device via the optical network; and
in response to the another request, obtain the at least one optical circuit attribute;
wherein the first optical network device signals the first optical circuit based on at least one factor and reserves the first optical circuit.

9. The device according to claim 8, wherein the controller is configured to trigger a routing metric update in response to accepting the at least one optical circuit attribute as the at least one routing metric.

10. The device according to claim 8, wherein the controller is configured to provide the at least one routing metric to the at least one second layer 3 network device.

11. The device according to claim 8, wherein the at least one optical circuit attribute includes the optical circuit distance of the first optical circuit and the optical circuit latency of the first optical circuit.

12. The device according to claim 8, wherein the optical circuit latency includes a link latency of the first optical circuit and a node latency of the first optical circuit.

13. The device of claim 8, wherein the first layer 3 network device is a routing client and the first optical network device is an edge optical server network node connecting the first layer 3 network device to the optical network, and wherein the at least one optical circuit attribute is provided in a dynamic control-plane protocol message that includes at least two from among: a link type, a link identifier, a local interface Internet protocol address, a remote interface Internet protocol address, the optical circuit distance, and the optical circuit latency.

14. A method comprising:
exchanging data, by an optical network device, with a first layer 3 network device;
exchanging data, by the optical network device, with at least one other optical network device, which is in an optical network that includes the optical network device;
receiving, by the optical network device from the first layer 3 network device, a request for at least one optical circuit attribute;
obtaining, by the optical network device, the at least one optical circuit attribute including an optical circuit distance and/or an optical circuit latency of a first optical circuit; and
upon expiration of a time period equal to a time-scaled threshold, providing, by the optical network device, the at least one optical circuit attribute to the first layer 3 network device, wherein the optical network device connects the first layer 3 network device to the optical network;
receiving, by the optical network device from the first layer 3 network device, another request; and
in response to receiving the another request:
providing the at least one optical circuit attribute to the first layer 3 network device, wherein the another request comprises requesting by the first layer 3 network device to establish a network connection with a second layer 3 network device via the optical network,
signaling the first optical circuit based on at least one factor, and
reserving the first optical circuit.

15. The method according to claim 14, wherein the at least one optical circuit attribute includes the optical circuit distance of the first optical circuit and the optical circuit latency of the first optical circuit.

16. The method according to claim 14, wherein the obtaining and the providing is further performed in response to any one or more of the following: a path optimization in the optical network or a restoration in the optical network.

17. The method of claim 14, wherein the first layer 3 network device is a routing client and the optical network device is an edge optical server network node connecting the first layer 3 network device to the optical network, and wherein the at least one optical circuit attribute is provided in a dynamic control-plane protocol message that includes at least two from among: a link type, a link identifier, a local interface Internet protocol address, a remote interface Internet protocol address, the optical circuit distance, and the optical circuit latency.

18. The method of claim 14, wherein the optical circuit latency includes a link latency of the first optical circuit and a node latency of the first optical circuit.

19. The method of claim 14, further comprising:
providing the at least one optical circuit attribute to the first layer 3 network device based on the at least one optical circuit attribute changing by more than at least one threshold value.

20. The method of claim 14, further comprising:
providing the at least one optical circuit attribute to the first layer 3 network device via a dynamic control plane protocol.

\* \* \* \* \*

UNITED STATES PATENT AND TRADEMARK OFFICE
CERTIFICATE OF CORRECTION

| | | |
|---|---|---|
| PATENT NO. | : 10,771,182 B2 | Page 1 of 1 |
| APPLICATION NO. | : 15/961903 | |
| DATED | : September 8, 2020 | |
| INVENTOR(S) | : Randy Zhang et al. | |

It is certified that error appears in the above-identified patent and that said Letters Patent is hereby corrected as shown below:

In the Claims

Claim 1, Column 8, Lines 41-43, please replace "network; and upon" with --network; upon--

Claim 14, Column 10, Lines 28-29, please replace "circuit; and upon" with --circuit; upon--

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*